United States Patent [19]

Higashiyama et al.

[11] Patent Number: 4,630,584

[45] Date of Patent: Dec. 23, 1986

[54] FUEL OCTANE RESPONSIVE INTERNAL COMBUSTION ENGINE IGNITION SYSTEM

[75] Inventors: Kazuhiro Higashiyama, Ebina; Kazuhiro Ishigami, Yokohama, both of Japan

[73] Assignee: Nissan Motor Co., Ltd., Yokohama, Japan

[21] Appl. No.: 717,102

[22] Filed: Mar. 28, 1985

[30] Foreign Application Priority Data

Apr. 5, 1984 [JP] Japan .................................. 59-68035

[51] Int. Cl.⁴ ............................................. F02P 5/145
[52] U.S. Cl. ..................................... 123/425; 123/421
[58] Field of Search ........................ 123/425, 421, 435

[56] References Cited

U.S. PATENT DOCUMENTS 4,376,429 3/1983 Youngblood ...................... 123/425
4,471,736 9/1984 Yoshida et al. .................... 123/425

FOREIGN PATENT DOCUMENTS 0138495 4/1985 European Pat. Off. .
58-143169 8/1983 Japan ................................. 123/425

Primary Examiner—Andrew M. Dolinar
Attorney, Agent, or Firm—Schwartz, Jeffery, Schwaab, Mack, Blumenthal & Evans

[57] ABSTRACT

In order to simultaneously prevent engine damage due to violent knocking and maintain good fuel economy, an ignition control system firstly controls the ignition timing according to a first schedule suited for fuel having a first octane rating until the engine enters a preselected mode of operation. At this time the ignition is advanced until knocking occurs. The conditions under which the knocking is generated are compared with prememorized data and if this reveals that the octane value of the fuel is higher than that for which the first schedule is suited control is switched to a second schedule designed for fuel having a second and higher octane value.

9 Claims, 14 Drawing Figures

FIG. 9

| Tp \ N | 1 | 2 | - | - | - |
|---|---|---|---|---|---|
| 1 | $A_{11}$ | $A_{21}$ | - | - | |
| 2 | $A_{12}$ | $A_{22}$ | | | |
| ¦ | ¦ | | | | |
| ¦ | ¦ | | | | |
| ¦ | | | | | |

FIG. 10

| Tp \ N | 1 | 2 | - | - | - |
|---|---|---|---|---|---|
| 1 | $B_{11}$ | $B_{21}$ | - | - | |
| 2 | $B_{12}$ | $B_{22}$ | | | |
| ¦ | ¦ | | | | |
| ¦ | ¦ | | | | |
| ¦ | | | | | |

FIG. 11

| N | 1 | 2 | - | - | - |
|---|---|---|---|---|---|
| KLM1 | $\beta_{11}$ | $\beta_{12}$ | - | - | |

FIG. 12

| N | 1 | 2 | - | - | - |
|---|---|---|---|---|---|
| KLM2 | $\beta_{21}$ | $\beta_{22}$ | - | - | |

FUEL OCTANE RESPONSIVE INTERNAL COMBUSTION ENGINE IGNITION SYSTEM

BACKGROUND OF THE INVENTION

1. Field of the Invention

The present invention relates generally to an ignition system which includes a knock sensor or the like and which controls the ignition timing in response to the output of the sensor so as to optimize engine operation, and more specifically to such an ignition system which can switch between a control schedule suited for fuels having a normal octane rating (e.g. regular) and a schedule suited for high octane fuel.

2. Description of the Prior Art

In order to meet the ever tightening air pollution requirements the use of lead additives (e.g. tetraethyl lead) has been restricted thus inducing a tendency toward the use of low octane lead-free fuel. However, engines designed for operation on such fuels inevitably have low compression ratios so as to avoid knocking. However, as is well known, low compression engines lack desired performance characteristics and thus a demand for an engine which can be operated on lead free high octane fuel has arisen.

However, a drawback with the just mentioned type of engine occurs in that, if for any reason the engine should be supplied with low octane fuel, severe knocking tends to occur and sometimes leads to engine damage.

In order to overcome this problem it has been proposed to provide the engine with an ingition system which can be switched between an ignition control schedule suited for high octane fuel to one which is suited for low octane fuel (note that low octane fuel will be referred to as regular hereinafter). However, this switching is effected manually, thus inducing the possibility of human error.

Accordingly, in Japanese Patent Application First Provisional Publication No. 58-143169 an arrangement has been proposed wherein the ignition schedule suited for high octane fuel is initially used and, if under a predetermined mode of engine operation, knocking is detected (indicating the use of regular fuel), the system is switched over to a schedule suited for low octane or regular fuel. Viz., if knocking is detected under a predetermined mode of engine operation the system senses the use of regular fuel and switches the ignition control schedule. This newly selected schedule is subsequently maintained either for a predetermined period of time or until the engine is stopped.

However, with this system it is possible that the engine will directly enter a high power mode of operation and thus not pass through the mode in which the decision to switch from the high octane control schedule to the one suited for regular fuel is made. Under such instances, due to the highly advanced ignition timing used with high octane fuel, the combustion of regular fuel tends to produce violent engine damaging knocking.

Further, with the above described system, the degree to which the ignition timing can be advanced or delayed it not limited, whereby, unless the engine knocking is accurately sensed, highly undesirable knocking can occur due to excessive ignition timing advance. To avoid this problem it is necessary to accurately distinguish knocking from background noise. Thus the need arises for rather complex and expensive sensor apparatus.

SUMMARY OF THE INVENTION

It is an object of the present invention to provide an ignition system which in the interest of engine protection firstly operates the ignition system according to a first schedule suited for fuel having first octane value (regular) and which switches over to a second schedule (high octane) in the event that monitoring of engine conditions indicates that the fuel being combusted has an octane value higher than that for which the first schedule is suited.

In brief, the above object is achieved by an arrangement wherein an ignition control system firstly controls the ignition timing according to a first schedule suited for fuel having a first octane rating until the engine enters a preselected mode of operation. At this time the ignition is advanced until knocking occurs. The conditions under which the knocking is generated are compared with prememorized data and if this reveals that the octane value of the fuel is higher than that for which the first schedule is suited, control is switched to a second schedule designed for fuel having a second and higher octane value.

In more specific terms a first aspect of the present invention comes in an internal combustion engine which has a combustion chamber; a first sensor for sensing a parameter which varies with the presence of knocking phenomena in the combustion chamber of the engine; a second sensor for sensing the load on the engine; a third sensor responsive to the roational speed of the engine; a spark generating arrangement for producing a spark in the combustion chamber; and a control circuit responsive to the outputs of the first second and third sensors for controlling the timing at which the spark is generated, the control circuit including control means for: (a) causing the spark to be generated according to a first schedule suitable for fuel having a first octane value, (b) sensing the engine entering a predetermined mode of operation; (c) advancing the ignition timing until the first sensor detects the knocking phenomena; (d) comparing the conditions under which the knocking occurs with pre-recorded data, (e) determing the octane value of the fuel being combusted in the combustion chamber, and (f) causing the spark to be generated according to a second schedule suitable for fuel having a second octane value higher than the first octane value in the event that the octane value of the fuel being combusted in the combustion chamber is determined to be higher than for which the first schedule is suited.

A second aspect of the present invention comes in a method of controlling an internal combustion engine which has a combustion chamber comprising the steps of: (a) sensing a parameter which varies with the presence of knocking phenomena in the combustion chamber; (b) sensing the load on the engine; (c) periodically outputting a first signal and a plurality of second signals; (d) producing a spark in the combustion chamber; and (e) controlling the timing at which the spark is generated via the steps of: (f) causing the spark to be generated according a schedule suitable for fuel having a first octane value; (g) sensing the engine entering a predetermined mode of operation; (h) advancing the ignition timing until knocking occurs in the combustion chamber; (i) comparing the conditions under which the knocking occurs with pre-recorded data; (j) determining the octane value of the fuel being combusted in the combustion chamber; and (k) causing the spark to be generated according to a second schedule suitable for fuel having a second octane value higher than the first octane rating in the event that the step of determining indicates an octane value higher than that for which the first schedule is suited.

BRIEF DESCRIPTION OF THE DRAWINGS

The features and advantages of the present invention will become more clearly appreciated from the following description taken in conjunction with the accompanying drawings in which:

FIGS. 9 to 12 show maps or tables utilized during the running of the programs depicted in FIGS. 5 to 8 for the purpose of deriving the appropriate ignition advance timings and limits vital for the engine control which characterizes the present invention;

DETAILED DESCRIPTION OF THE PREFERRED EMBODIMENTS

Figure 1:
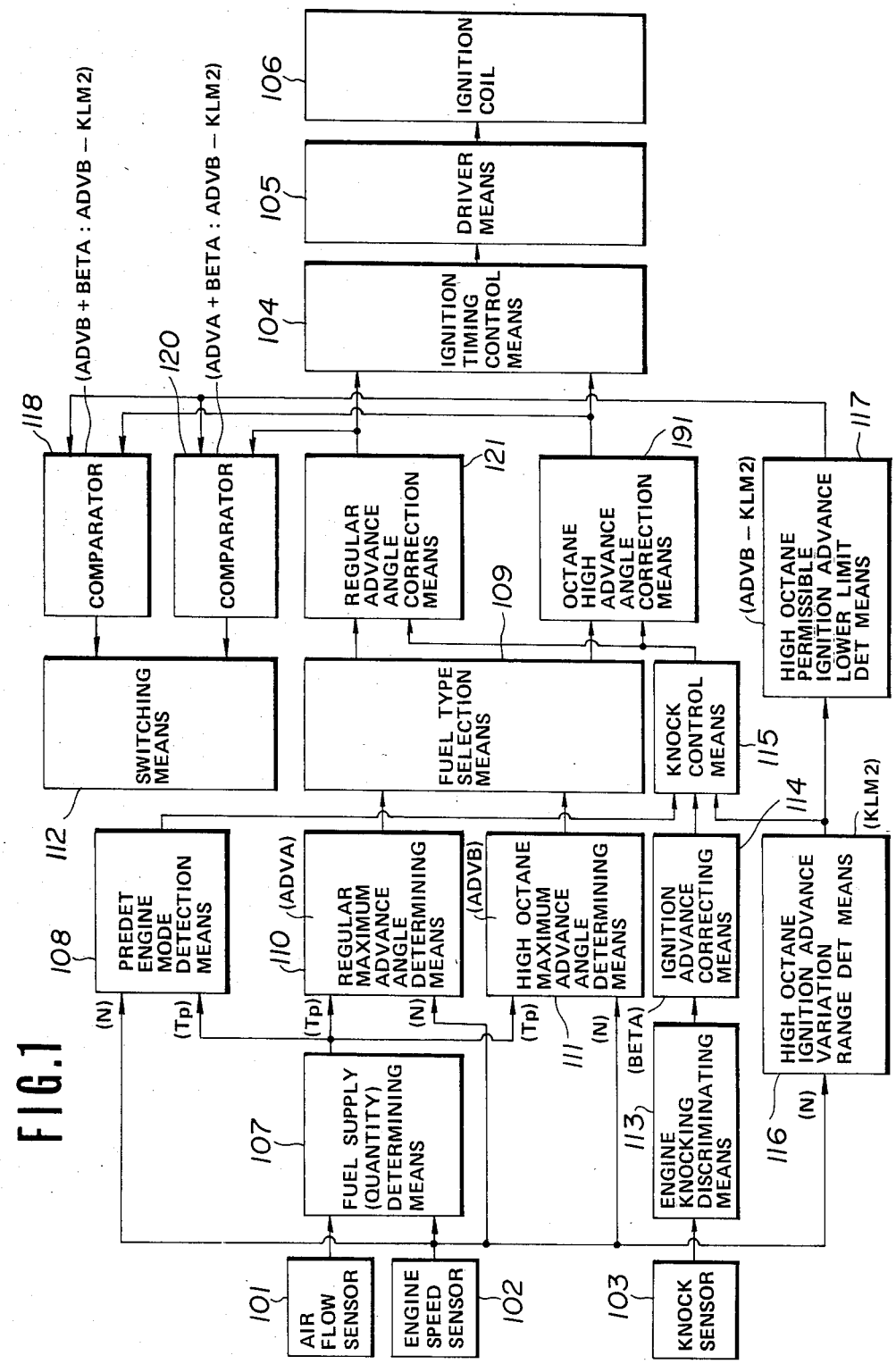
FIG. 1 is a schematic layout of the system which embodies the present invention in functional block diagram form.

FIG. 1 shows in functional block form, the system which embodies the present invention. As shown, the control system which characterizes the present invention is fed data signals from an air flow sensor 101, an engine rotational speed sensor 102 and a knock sensor 103. The system outputs control signals to an ignition timing device or means 104 which in turn energizes a driver arrangement 105 (e.g. a power transistor) which breaks the primary current of an ignition coil and induces a spark at the spark plug of the engine. By way of example, the ignition timing control means is arranged to receive a reference signal which is produced at 70° before TDC and responds to the inputs from the control system in a manner to energize the driver means 105 at a timing of FADV° (i.e. 70°−ADV° (the required degree of advance)). The reference signal mentioned above may be produced by a crankangle sensor which generates one or more reference signals per revolution of the engine.

Figure 13:
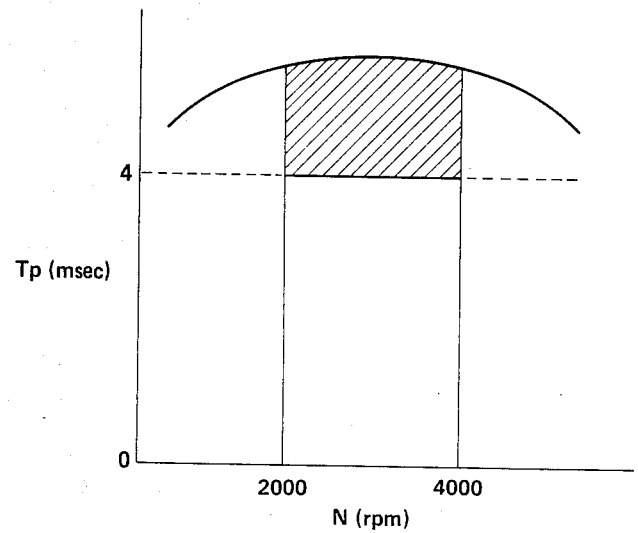
FIG. 13 shows in graphical form showing (in hatching) an engine operational mode or range in which the control system according to the present invention conducts its survey to determine if the engine is being operated on regular or high octane fuel.

The control system is arranged to include means (107) for determining in response to data signals (N) and (Q) (viz., the engine speed and the amount of air being inducted into the engine) the amount of fuel which should be supplied to the engine under the instant set of operational conditions. The system further includes means (108) for detecting the engine entering a preselected engine speed range or mode of engine operation (see FIG. 13 for example). As shown, this device receives data signals (N) and (Tp)—the latter denoting the amount of fuel which has been determined by the fuel supply (quantity) determining means 107.

A "fuel type selection circuit" or means 109 is arranged to be conditioned to receive data input from one of a circuit arrangement which shall be referred to as "regular maximum advance angle determining means" 110 and a circuit arrangement which shall be referred to as a "high octane maximum advance angle determining means" 111, under the control of a switching means 112 and subsequently relay the ignition timing data to the ignition timing control means 104.

The two devices 110 and 111 mentioned above are arranged to receive data inputs (N) and (Tp) and derive the most appropriate ignition advance angle for the instant set of operational conditions.

The output of the engine knock sensor 103 is fed to an arrangement or means 113 which discriminates between background vibration or noise and the vibration generated by knocking phenomena which occur in the combustion chambers of the engine. The output of this "engine knocking discrimination means" 113 is fed to an "ignition advance correction means" 114. This device (114) develops a correction factor BETA which is used to advance the ignition timing until knocking is detected as will become clear hereinlater.

A circuit arrangement 115 which shall be referred to as a "knock control means" is arranged to receive inputs from the "predetermined engine mode detection means" 108 the "ignition advance correcting means" 114 and from "high octane ignition advance variation range determining means" 116. This means develops, in response to the instant engine speed, a factor KLM2 which when subtracted from the instant value of ADVB (the degree of advance most suited to operate the engine for the instant set of operating conditions when the fuel being combusted in high octane) defines a range ADVD to ADVB−KLM2 within which it is preferable to maintain the ignition advance in the event that the engine is operating on high octane fuel.

A "high octane permissible ignition advance lower limit determining means" 117 is arranged to perform the ADVB−KLM2 subtraction to determine the minimum advance which should occur during the running of the engine on high octane fuel. The value derived by this subtraction is fed to a comparator 118 wherein it is compared with the instant value of ADVB+BETA derived in a "high octane advance angle correction means" 191.

The output of the "high octane permissible ignition advance lower limit determining means" 117 is also fed to a second comparator 120 wherein the value of ADVB−KLM2 is compared with ADVA+BETA (the instant advance for regular fuel). This comparator also receives an input from a "regular advance angle correction means" 121 wherein the instant value of ADVA is increased by the addition of the instant value of BETA.

If engine knocking is detected and the engine is indicated by detection means 108 as operating in the previously mentioned predetermined mode, and the outcome of the comparison of ADVA+BETA with the value of ADVB−KLM2 in comparator 120 indicates that AD-VA+BETA>ADVB−KLM2 then the decision that the engine is running on high octane fuel is made and "switching means" 112 conditions the fuel type selection means 109 to selectively connect the output of high octane maximum advance angle determining means 111 to the ignition timing control means 104 via advance angle correction means 191.

On the other hand, if the comparison in comparator 118 indicates that ADVB+BETA<ADVB−KLM2 then the switching means 112 is conditioned to switch the control from the high octane to regular control schedule. Viz., condition the fuel type selection means 109 to selectively connect the output of advance angle determining means 110 to ignition timing control means 104 via #121.

It should be noted that the "fuel type selection means" 109 is arranged to initially connect the output of regular maximum advance angle determining means 110 to the ignition timing control means 104 via regular maximum advance angle determining means 121 and to allow the engine to be operated on the high octane control schedule only after the operation of the engine has entered the predetermined mode or range of operation and the ignition timing advance (via the increasing of the value of BETA) has been increased to the point of inducing engine knocking. That is to say, upon the engine entering said predetermined mode of operation, the control exercised by knock control means 115 is temporarily suspended and the ignition advanced by increasing the value of BETA. It should be also noted that the rate at which the value of BETA is increased is higher than the rate at which it is reduced.

Thus, with the system according to the present invention, due to the initial usage of the low octane control schedule, even if the engine mode should suddenly change so that a determination as to which type of fuel the engine is operating on cannot be made before the high power mode is entered, still the engine is prevented from damage as the highly advanced ignition timings suited for high octane type fuels have not yet been permitted to occur and thus the severe knocking which tends to occur with regular fuel is obviated. Further, as the ignition advance is constantly monitored and the appropriate advance schedule employed under modes other than that in which the fuel type determination is made, fuel economic operation of the engine is also promoted.

Figure 2:
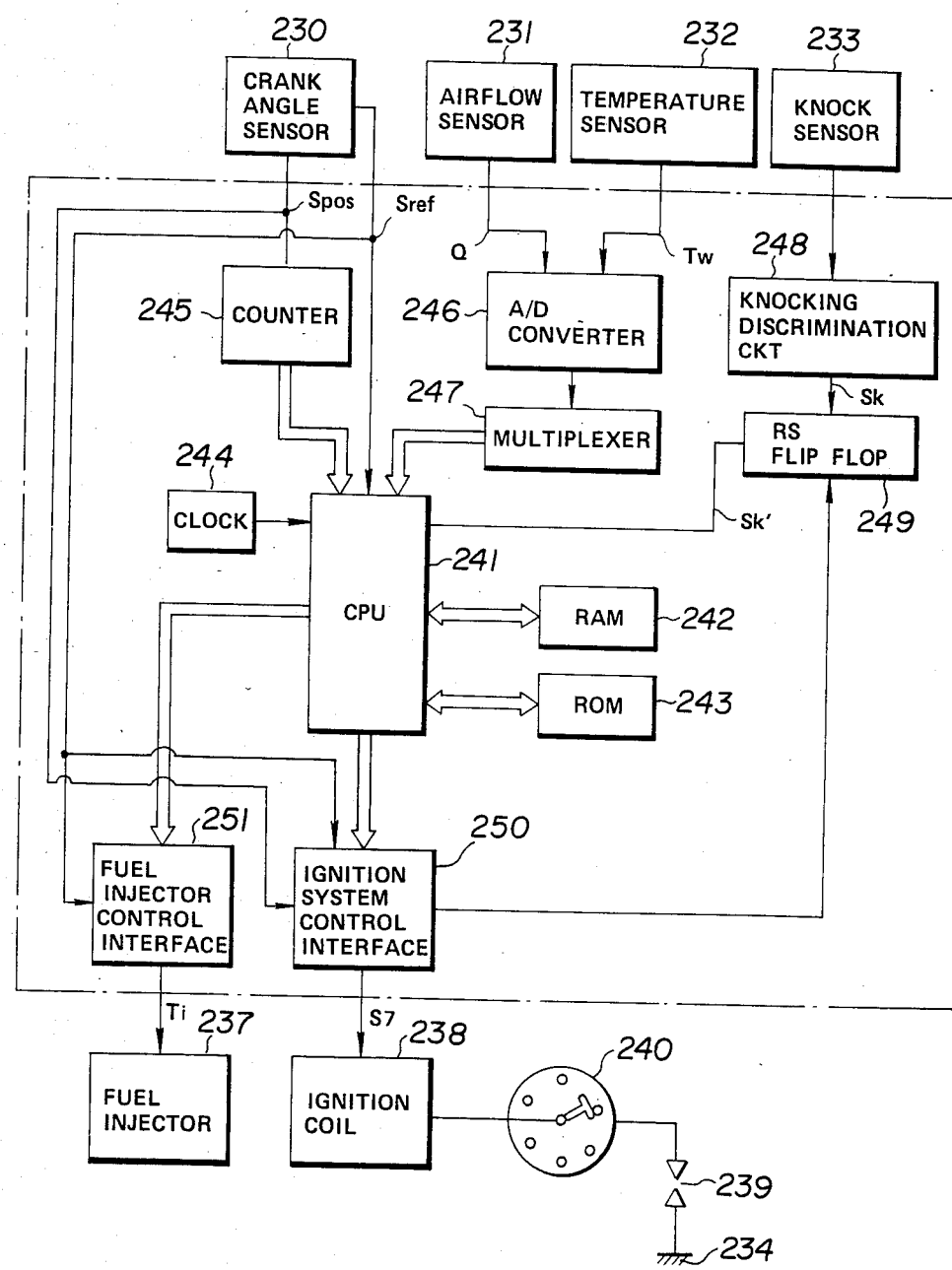
FIG. 2 shows in block diagram form an embodiment of the present invention.

FIG. 2 shows an embodiment of the present invention which is applied to a six cylinder internal combustion engine. This arrangement includes a crankangle sensor 230 which is arranged to produce three reference pulses (Sref) per engine revolution and a series of timing or position indicating pulses (Spos); an air flow sensor 231 which outputs a signal Q indicative of the amount of air being inducted into the engine; a temperature sensor 232 which is arranged to sense the temperature of the engine coolant (or alternatively the temperature of engine wall structure per se) and issue a signal Tw indicative of the sensed temperature; and a knock sensor 233 which is responsive to engine vibrations indicative of knocking occuring in the combustion chambers of the engine 234.

The arrangement further includes a control circuit 236 which receives the data inputs from the above mentioned sensors and outputs control signals to a fuel injector 237 and an ignition coil 328 which is operatively connected with a spark plug 239 (only one shown) via a distributor 240.

The control circuit 236 in this instance includes a microprocessing arrangement including a CPU 241, a RAM 242 and a ROM 243. A clock circuit 244 is connected with the CPU 241 in a manner to supply clock pulses having a predetermined frequency. In this instance one pulse per 10 msec.

The CPU 241 further receives a data input from a counter circuit 245 which counts the number of position signals which are received from the crank angle sensor 230. The engine speed is derived by calculating the number of position pulses which are produced per unit time. In this embodiment, the reference signals Sref produced by the crankangle sensor 230 are fed to the CPU as a hardwire interrupt.

The outputs of the airflow sensor 231 and the temperature sensor 232 are fed to an A/D converter 246 and are subsequently sequentially delivered to the CPU 241 via a multiplexer 247.

The output of the knock sensor 233 is fed to a knocking discimination circuit 248 which ascertains the presence of knocking. In the event that the circuit 248 detects the presence of vibrations characteristic of engine knock, a signal Sk is fed to a set terminal S of an RS flip flop 249. This triggers the flip flop 249 into a state wherein it outputs a high level signal Sk' to the CPU 241. The reset terminal R of the flip flop 249 is connected to an ignition system control interface 250 so as to be reset each time the ignition coil 238 is induced to discharge its accumulated power by the issuance of a control signal S7.

As will be appreciated, the instant embodiment not only controls the ignition timing but also that of the fuel injection. That is to say, the CPU 241 samples the value of N (the engine speed derived by determining the frequency at which the position pulses are produced by the crankangle sensor 230) and Q the amount of air inducted into the engine (obtained by A/D converting the airflow sensor 232 input). Subsequently, based on the sampled values of N and Q the CPU 241 reads a predetermined injection pulse width Tp out of ROM (via table look-up for example) and temporarily sets same in RAM. This pulse width Tp is derived using the following equation:

$$Tp = Q/N \times K$$

where K is a constant.

The value of Tp is then modified in view of various engine operation parameters such as the engine coolant temperature and a modified injection pulse having a pulse width Ti is delivered to the fuel injector at the appropriate instant.

Figure 3:
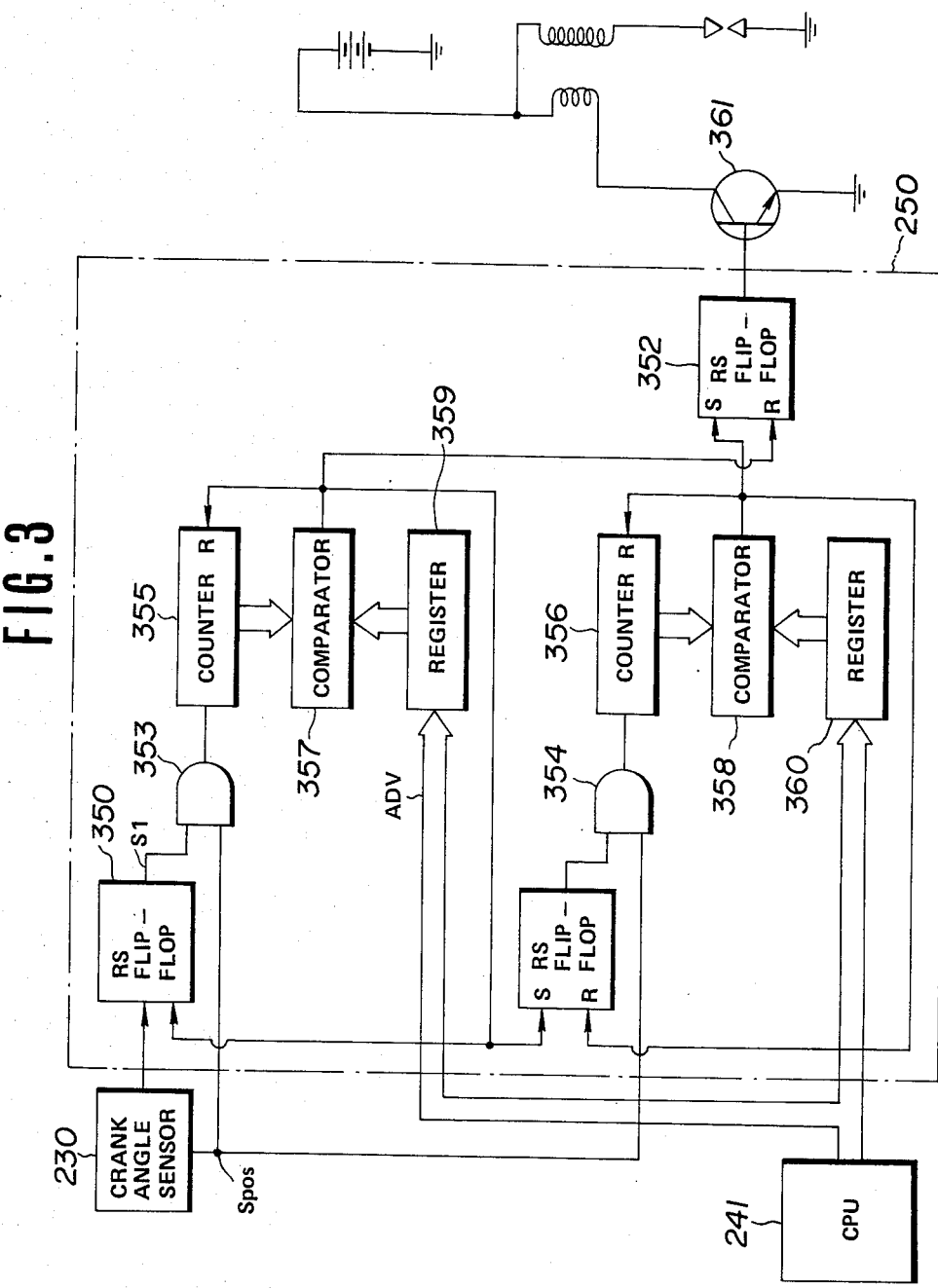
FIG. 3 shows in block diagram form a section of the arrangement shown in FIG. 2.

Reference is now made of FIG. 3 which shows in block diagram form the ignition control interface 250.

Figure 4:
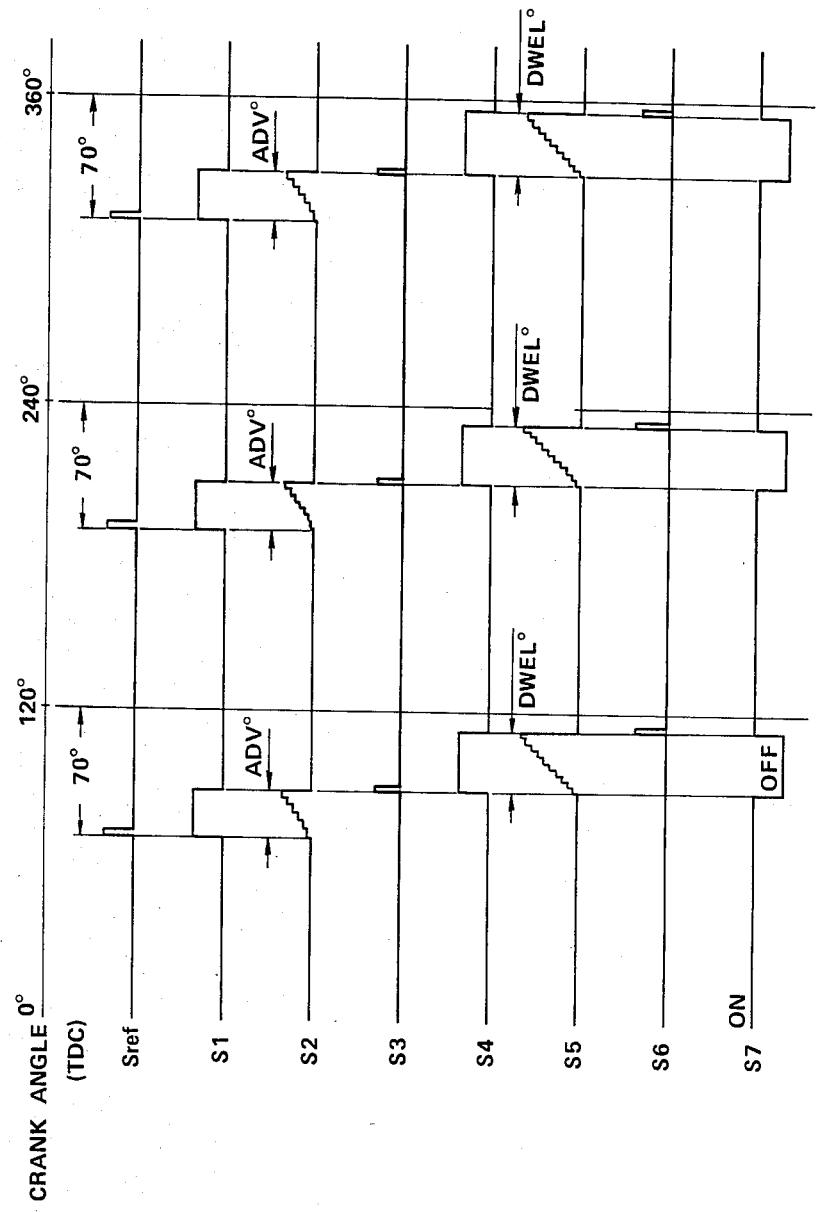
FIG. 4 is a timing chart showing the relationship between the various signals produced in the embodiment of the present invention shown in FIGS. 2 and 3.

It should be noted that this interface outputs the previously mentioned control signal S7 (see the timing chart given in FIG. 4) and thus induces the initiation of a spark at the gap of the spark plug each time the signal S7 falls from a high level to a low one.

More specifically, this circuit includes first, second and third RS flip flop circuits 350, 351 and 352; first and second AND gates 353, 354; first and second counters 355, 356; first and second comparators 357, 358; and first and second registers 359, 360, all connected as shown.

The registers 359 and 360 are connected with CPU 241 via a data bus, the AND gates 353 and 354 with the crankangle sensor 230 so as to receive the Spos signals therefrom, while the RS flip flop 352 is connected wth a power transistor 361 so as to render same non-conductive each time the signal S7 falls to a low level. With the above described circuit, the instant value of ADV (viz., one of ADVA and ADVB) which meets the momentary engine needs is set into the register 359 via the data bus. Counter 355 counts up the number of Spos signals until the occurrence of the Sref signal at 70° before TDC. The comparator 357 outputs a pulse (see signal S3 in FIG. 4) to the reset terminal of the RS flip flop 352 each time the counter coincides with the value of ADV stored in register 359. Accordingly, at an angle which corresponds to 70°−ADV, S7 falls to a low level and blocks off the primary current in the ignition arrangement.

The period for which current flows (see S5 in FIG. 4) begins at angle which corresponds to 70°−ADV°. The period for which the discharge should continue is prememorized in ROM in terms of voltage and is read out by the CPU and subsequently a value indicative thereof set into the register 360.

The function of the counter 356 and the comparator 358 are similar to those given in conjunction with elements 355 and 357 above. That is to say, the counter 356 counts up in response to the pulses supplied thereto from the crankangle sensor 230 and induces the comparator 358 to issue a pulse (signal S6) each time the count coincides with the value set in the register 360.

Accordingly, signal S7 assumes a high level at the end of the DWEL period, viz., at an angle 120°−ADV° after ignition (viz., 70°−ADV°) and thus terminates the spark inducing discharge.

FIGS. 5 to 8 show flow charts which depict the steps which characterize the operations executed in the microprocessing section of the present invention.

The routines executed in the CPU 241 of the arrangement shown in FIGS. 2 and 3 can be divided into first and second groups. The first consisting of interrupt outines 1 and 2, and the second of a background routine (BGJ) which is run during the intervals the interrupt routines are not being run. Interrupt routine 1 is executed with a predetermined relationship with the engine speed (in response to the issuance of signal Sref) while the second (interrupt routine 2) is carried out at predetermined time intervals (for example every 10 msec).

It will be noted that the fuel injection control routine is executed in parallel with the ignition timing control. Explanation of the fuel injection control will be given briefly hereinafter with reference to FIG. 7.

As shown, subsequent to the initiation of the second interrupt routine by the output of the clock circuit 244, the values of Q, N and Tw are sampled at step B-1 while at step B-2 the sampled Q and Tw signals are A/D converted. Subsequently, in step B-3 the three values are temporarily stored in a latch (RAM). At step B-4 the rcorded data is used to derive Tp using the equation:

$$Tp = Q/N \times K,$$

and stored temporarily in RAM.

In step B-5 the value of Tp derived in step B-4 is modified by the application of COEF, a coefficient which includes factors such as the engine coolant temperature Tw, a voltage correction factor Ts, Ktw—the rate at which the temperature of the engine coolant is changing and Kmr—a predetermined air-fuel ratio factor based on the values N and Tp.

The value of Ti is stored in RAM and subsequently read out to the fuel injection control circuit interface 251.

However, it will be noted that even though the value Tp is derived for the purposes of injection control, it is advantageously used in conjunction with N for the purposes of ignition timing control thus permits a simplification in the control programs.

Figure 5:
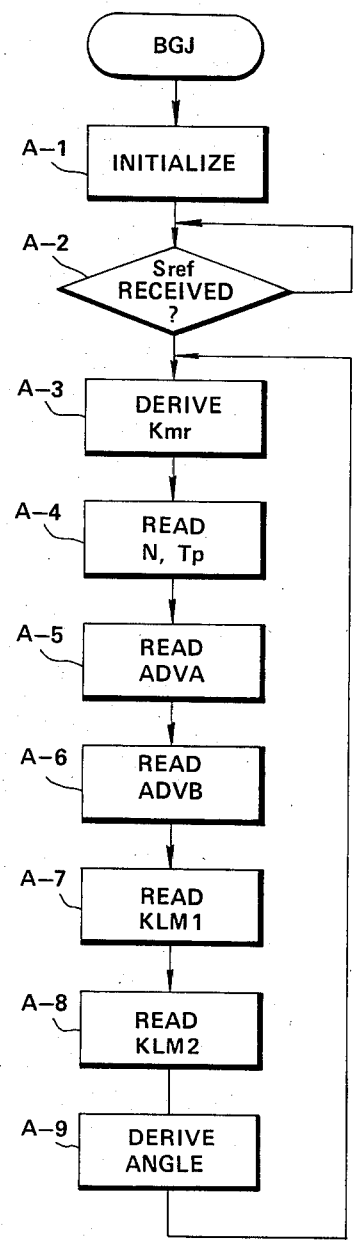
FIGS. 5 to 8 are flow charts showing the characterizing steps of various programs or routines which are run in the CPU of the arrangement shown in FIGS. 2 and 3.
Figure 6:
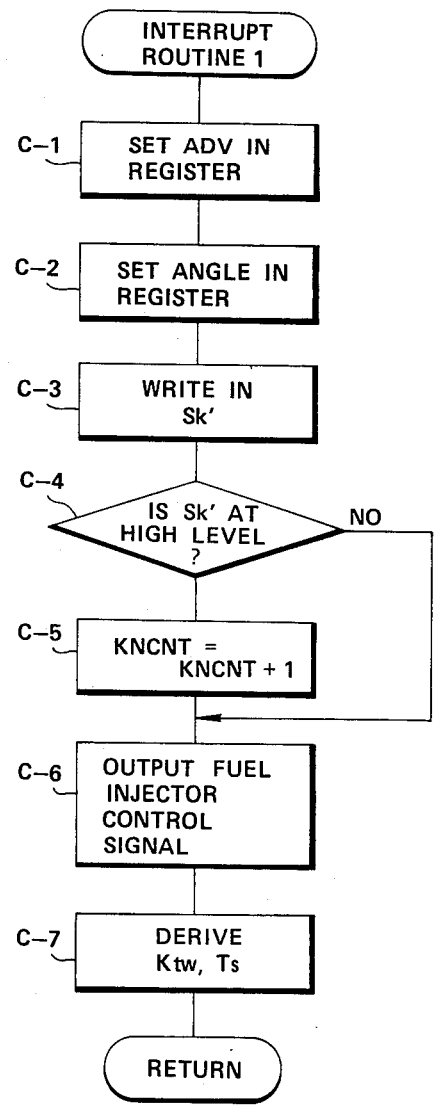
Figure 7:
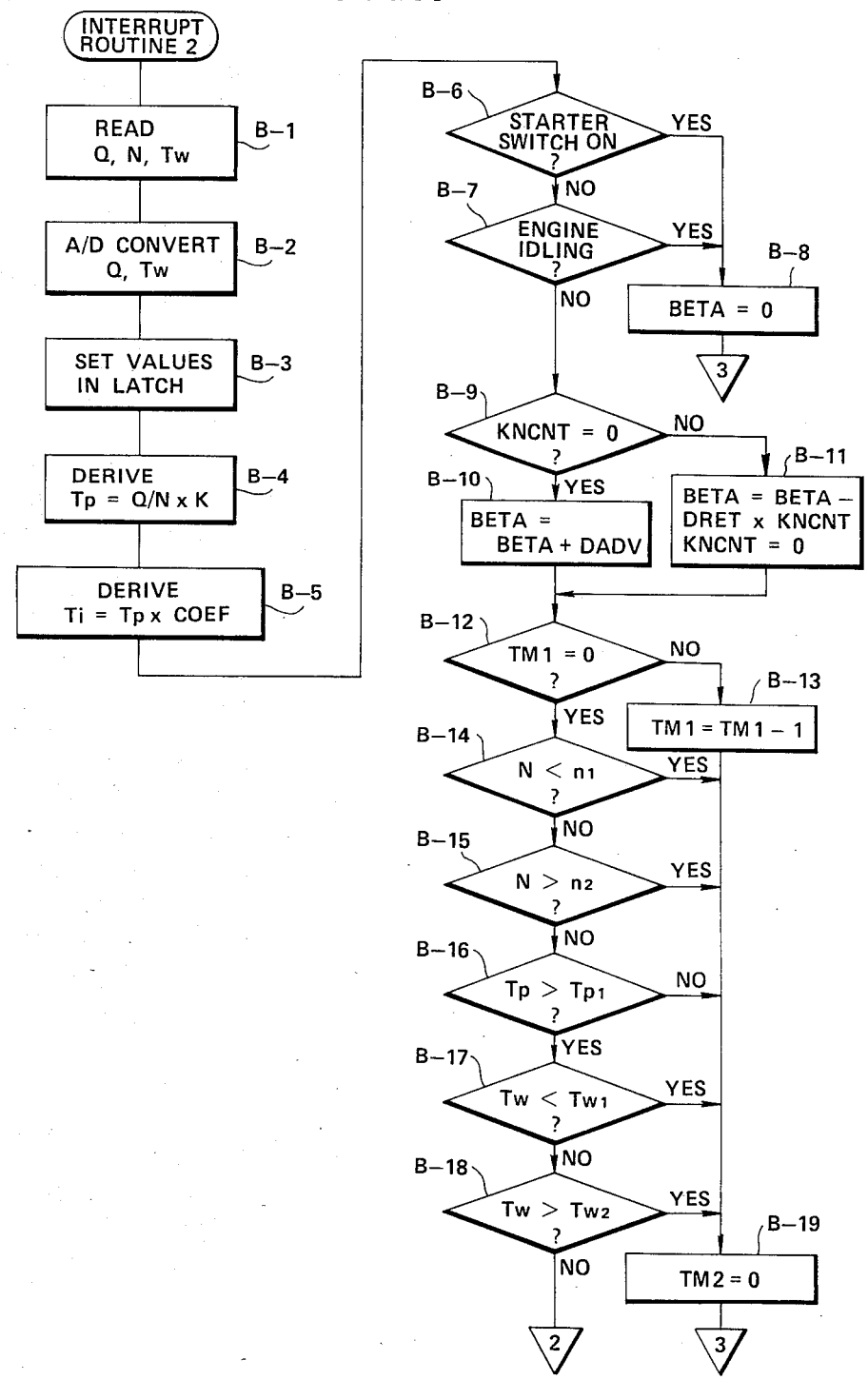
Figure 8:
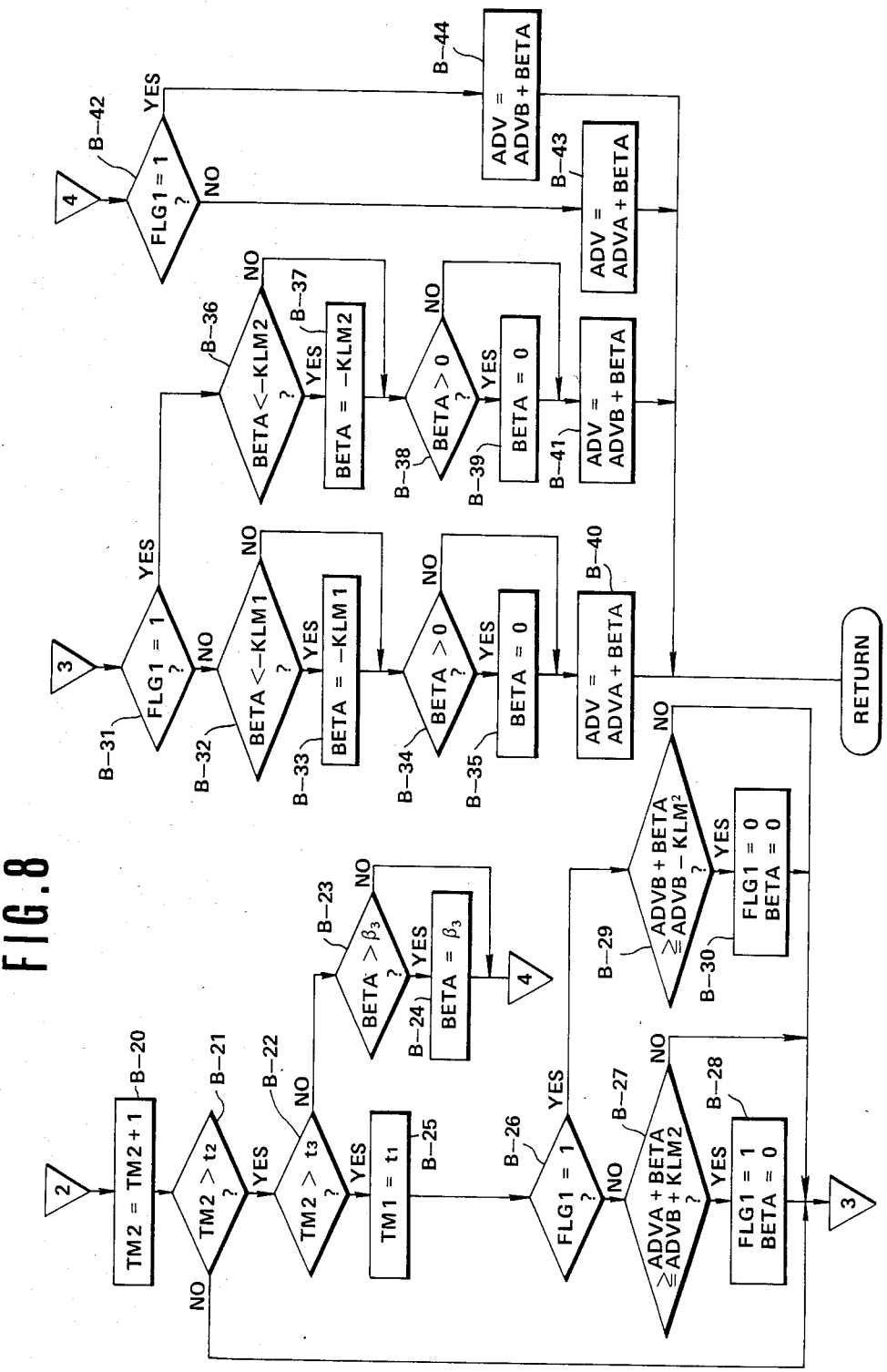

In order to facilitate further explanation it is deemed advantageous to describe the so called "background control routine" BGJ at this point. This routine, as shown in FIG. 5, subsequent to initialization (step A-1) awaits the receipt of signal Sref before proceeding to in step A-3 determining the previously mentioned factor Kmr.

At step A-4 the values of N and Tp determined in steps A-1 to A-2, are read out of RAM. At steps A-5, A-6 these values are employed to derive values for ADVA and ADVB, respectively. In this instance these derivations takes the form of table look-ups wherein maps of ADVA and ADVB plotted in terms of N and Tp (see FIGS. 9 and 10) are set in ROM 43. At steps A-7 and A-8 similar look-ups are performed utilizing tables such as shown in FIGS. 11, 12 wherein the factors used to derive the factors KLM1 and KLM2 which when subtracted from ADVA and ADVB respectively, provide the lower limits of a range within which it is desirable to hold the ignition timing. At step A-9 the angle over which it is preferred to maintain the spark generation is derived and subsequently readout.

Upon issuance of signal Sref interrupt routine 1 is initiated. In step C-1 of this routine the value of ADVA derived in step A-5 is set into register 359 of the ignition system control interface 250.

At step C-3 the output (Sk') of the RS flip flop 249 is sampled and the result written into RAM. As step C-4 it is determined if the signal Sk' is at a high level or not. In the event that this signal has assumed a high level (indicating that the engine is knocking) the program proceeds to step C-5 wherein a knocking count KNCNT is incrementally increased. However, if the engine is not knocking and the signal Sk' is at a low level, then the program by-passes step C-5 and goes directly to step C-6 wherein the fuel injection control signal (derived in steps B-1 to B-5) is read out to the fuel injection control interface 251. At step C-6 values of Ktw and Ts are obtained and set into RAM in preparation for future calculations.

Returning now to FIG. 7 which shows interrupt routine 2 (run at predetermined time intervals), and wherein subsequent to the derivation of Ti (described hereinbefore) at step B-6 it is determined if the engine starter switch is on or not. Viz., it is determined if the engine is in the process of being cranked. If the outcome this enquiry is positive steps B-9 to B-30 are by-passed.

AT step B-7 it is determined if the engine is idling. If so, at step B-8 the factor BETA used to modify the values of ADVA and ADVB is set to zero (0). On the other hand, if the engine is not idling, the program flows to step B-9 wherein the current value of KNCT (knocking count) is sampled. In the event that the count is zero, the program goes to step B-10 wherein BETA is increased to BETA+DADV where DADV is a factor which is increased at a rate of 0.02° per 10 msec by way of example. On the other hand, if the engine is knocking and the value of KNCNT is greater than zero then at step B-11 BETA is decreased by a factor of DRET×KNCNT wherein DRET is increased at a rate greater than that at which DADV is increased (for example at at rate of 1° per run).

However, the above mentioned correction is not carried out until the engine enters the previously mentioned predetermined range. To ascertain this condition steps B-14 to B-18 are arranged to determine the following conditions:

$$n1 < N < n2$$

wherein $n1 = 2000$ RPM and $n2 = 4000$ RPM for example;

$$Tp > Tp1$$

viz., the width of the injection pulse is 4 msec or more;

$$Tw1 < Tw < Tw2$$

viz., the engine temperature is within a predetermined range.

Upon it being determined that the engine is in fact operating within the predetermined mode (see time point B in FIG. 14) viz., if all of the above mentioned operation parameter requirements are met, the program induces a slight pause t2 (to ensure stable conditions prevail) before actually begining to add BETA to ADVA and ADVB at time point C. This is achieved by providing a soft clock (steps B-19–B-22) which waits until a time t2 has expired before permitting the program to proceed into steps B-26 to B-30 and further to prevent the entry into said steps in the event that a time t3 has expired. With this arrangement an initial fuel survey is conducted between the time points C and D—see FIG. 14.

Figure 14:
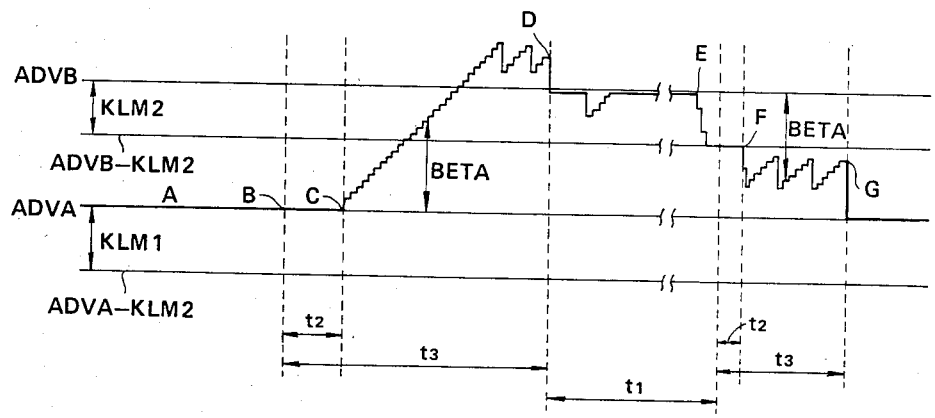
FIG. 14 is a timing chart illustrating the knocking correction control which is executed by the embodiment of the present invention.

As there is the possibility that a mixture of high and low octane may have been filled into the fuel tank of the vehicle and the nature of the fuel may change after the initial survey, the program is arranged to repeat the survey at predetermined time intervals t1. An example of this possibility is shown in FIG. 14 wherein at time point E the nature of the fuel changres. At time point F the second survey is conducted. In this embodiment the period t1 is selected to be 180,000 clock pulses or 30 minutes. In order to effect this a soft clock TM1 (see steps B-12, B-13 and B-25) counts down 1 each run of the program until as shown at step B-12 the count reaches zero and acess to step B-12 is again permitted. It will be noted that the soft clock TM1 is set at step B-25 and thus permits steps B-26 to B-30 to be run once before the clock TM1 is set counting.

It should be noted that when flag FLG1=1 the engine is indicated as operating on high octane fuel while when FLG1=0 the use of regular or low octane fuel is indicated as being combusted in the combustion chambers of the engine. As will be appreciated from the discussion relating to FIG. 1, flag FLG1 is always arranged to initially assume a value of 0 so that upon start of the engine, even if the engine is immediately caused to enter a high power output mode of operation, damage due to violent knocking will not occur.

In order to obviate the possibility that the ignition will be excessively advanced in the event that the knock sensor malfunctions, a safety factor $\beta 3$ is provided. This factor has a value which is greater than ADVA−ADVB for the instant set of operating conditions. Thus, in steps B-23 and B-24 the appropriate checking of the magnitude of BETA is routinely executed. In the event of knock sensor failure, the value of BETA is set at $\beta 3$ at step B-24 and at steps B-43 and B-44 this value implemented for ignition control.

In steps B-26, B-27 and B-29, the values of ADVA+BETA and ADVB+BETA are compared with ADVB−KLM2. In the event that the value of AD-VA+BETA equals or exceeds ADVB−KLM2 in step B-27 then at step B-28 flag FLG1 is set at "1" and the value of BETA reduced to zero. On the other hand, if in step B-29 the value of ADVB+BETA is equal to or greater than ADVB−KLM2 then at step B-30 both flag FLG1 and BETA are set at zero.

Following the fuel type determination, knocking correction is again carried out. During this phase BETA is provided with upper limits. Viz., as will be clear from steps B-33 to B-39, in the case of high octane fuel BETA is limited within a range of 0 to−KLM2 while in the event that the engine is being operated on regular fuel, BETA is limited within a range of 0 to −KLM1.

As the nature of the control exercised by the programs illustrated in the flow charts shown in Figs. 5 to 8 is deemed fully apparent to those skilled in the art of programming no further discription will be given for brevity.

What is claimed is:

1. In an internal combustion engine having a combustion chamber a first sensor for sensing a parameter which varies with the presence of knocking phenomena in the combustion chamber of said engine;

a second sensor for sensing the load on said engine;

a third sensor responsive to the rotational speed of said engine;

a spark generating arrangement for producing a spark in said combustion chamber; and a control circuit responsive to the outputs of said first, second and third sensors for controlling the timing at which said spark is generated, said control circuit including control means for:

(a) causing said spark to be initially generated according to a first schedule suitable for fuel having a first octane value, (b) sensing said engine entering a predetermined mode of operation;

(c) advancing the ignition timing until said first sensor detects said knocking phenomena;

(d) comparing the conditions under which said knocking occurs with pre-recorded data, (e) determining the octane value of the fuel being combusted in said combustion chamber, and (f) causing said spark to be generated according to a second schedule suitable for fuel having a second octane value higher than said first octane value in the event that the octane value of the fuel being combusted in said combustion chamber is determined to be higher than that for which said first schedule is suited.

2. An internal combustion engine as claimed in claim 1, further comprising: a fourth sensor which senses a parameter which varies with the temperature of the engine, and wherein said control circuit is responsive to the output of said fourth sensor.

3. An internal combustion engine as claimed in claim 1, wherein said control means periodically repeats said operation of advancing said ignition, said operation of comparing the conditions, said operation of determining the octane value, and selects one of said first and second schedules in response to said operation of determing the octane value.

4. An internal combustion engine as claimed in claim 1, wherein said control means controls the spark generation timing according to one of said first and second schedules when said engine is operating in a mode other than said predetermined one.

5. A method of controlling an internal combustion engine which has a combustion chamber comprising the steps of:
    (a) sensing a parameter which varies with the presence of knocking phenomena in said combustion chamber;
    (b) sensing the load on said engine;
    (c) periodically outputting a first signal and a plurality of second signals;
    (d) producing a spark in said combustion chamber; and
    (e) controlling the timing at which said spark is generated via the steps of:
    (f) causing said spark to be initially generated according a schedule suitable for fuel having a first octane value;
    (g) sensing the engine entering a predetermined mode of operation;
    (h) advancing the ignition timing until knocking occurs in said combustion chamber;
    (i) comparing the conditions under which said knocking occurs with pre-recorded data;
    (j) determining the octane value of the fuel being combusted in said combustion chamber; and
    (k) causing said spark to be generated according to a second schedule suitable for fuel having a second octane value higher than said first octane rating in the event that said step of determining indicates an octane value higher than that for which said first schedule is suited.

6. A method as claimed in claim 5, further comprising the steps of
    (l) sensing a parameter which varies with the temperature of said engine; and
    (m) controlling said spark generation timing in accordance with the temperature of said engine.

7. A method as claimed in claim 5, further comprising the step of (n) periodically repeating steps (g) to (k).

8. A method as claimed in claim 5, further comprising the step of:
    (o) controlling the spark generation timing according to one of said first and second schedules when said engine is operating in a mode other said said predetermined one.

9. A method as claimed in claim 5, further comprising the step of:
    (p) limiting the maximum degree to which the ignition timing can be advanced to a value less than the maximum permissible degree in the event that step (a) is unable to be executed due to apparatus malfunction.

* * * * *